United States Patent
Lin et al.

(10) Patent No.: US 11,840,630 B2
(45) Date of Patent: Dec. 12, 2023

(54) RESIN COMPOSITION AND ARTICLE MADE THEREFROM

(71) Applicant: Elite Material Co., Ltd., Taoyuan (TW)

(72) Inventors: Yu-Te Lin, Taoyuan (TW); Chien-Cheng Wang, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 0 days.

(21) Appl. No.: 17/746,727

(22) Filed: May 17, 2022

(65) Prior Publication Data
US 2023/0303835 A1    Sep. 28, 2023

(30) Foreign Application Priority Data

Mar. 28, 2022   (TW) .................. 111111629

(51) Int. Cl.
| | | |
|---|---|---|
| C08L 71/12 | (2006.01) | |
| C08L 53/02 | (2006.01) | |
| C08J 5/24 | (2006.01) | |

(52) U.S. Cl.
CPC .................. *C08L 71/12* (2013.01); *C08J 5/24* (2013.01); *C08L 53/02* (2013.01); *C08J 2353/02* (2013.01); *C08J 2371/12* (2013.01)

(58) Field of Classification Search
CPC ... C08L 71/12; C08L 53/02; C08J 5/24; C08J 2353/02; C08J 2371/12
USPC .......................................... 525/89
See application file for complete search history.

(56) References Cited

U.S. PATENT DOCUMENTS

| | | | |
|---|---|---|---|
| 2013/0096233 A1* | 4/2013 | Iwami | C08G 59/621 523/435 |
| 2022/0251376 A1* | 8/2022 | Osumi | H05K 1/0326 |

FOREIGN PATENT DOCUMENTS

| | | | | |
|---|---|---|---|---|
| WO | WO-2021024679 A1 * | 2/2021 | | B32B 15/12 |

* cited by examiner

*Primary Examiner* — David T Karst
(74) *Attorney, Agent, or Firm* — MUNCY, GEISSLER, OLDS & LOWE, P.C.

(57) ABSTRACT

A resin composition includes 50 parts by weight of a vinyl-containing polyphenylene ether resin, 1 part by weight to 30 parts by weight of a styrene-butadiene-styrene block copolymer and 0.5 part by weight to 30 parts by weight of a zinc molybdate-covered silica, wherein the zinc molybdate-covered silica has a mass ratio of zinc molybdate to silica of between 1:9 and 2:8. The resin composition may be used to make various articles, such as a prepreg, a resin film, a laminate or a printed circuit board, and at least one of the following properties can be improved, including gel time stability, copper foil peeling strength, difference rate of dissipation factor and conductive anodic filament test.

12 Claims, No Drawings

RESIN COMPOSITION AND ARTICLE MADE THEREFROM

CROSS-REFERENCE TO RELATED APPLICATION

This application claims the priority benefits of Taiwan Patent Application No. 111111629, filed on Mar. 28, 2022. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

In recent years, due to the development of electronic signal transmission toward the fifth generation mobile communication technology (5G) and the trend of high performance and miniaturization of electronic equipment, communication devices and personal computers, circuit boards were also developed toward multi-layer configuration, high density trace interconnection, and high speed signal transmission, thereby presenting higher challenges to the overall performance of circuit laminates such as copper-clad laminates. When a 5G communication transmission device operates at high frequency and high speed, the device will generate a large amount of thermal energy; with the operating temperature of the device increasing, firstly, if the dissipation factor of the laminate material continues to deteriorate as the temperature increases, the quality of signal transmission will be reduced, and secondly, due to the increase of the temperature of the laminate material, if the adhesion of the copper foil traces is reduced, it may also cause short circuit, resulting in failure of the device.

In addition, in a high temperature and high humidity environment, if the copper traces in the laminate material cause metal ion migration, the insulation of the laminate material will be deteriorated; in severe cases, it may even cause short circuit and crash the device. Therefore, there is a need for solving one or more of the above-mentioned problems.

SUMMARY

To overcome the problems facing prior arts, particularly one or more of the above-mentioned technical problems of conventional materials, it is a primary object of the present disclosure to provide a resin composition and an article made therefrom which may overcome at least one of the above-mentioned technical problems.

To achieve the above-mentioned objects, the present disclosure provides a resin composition, comprising 50 parts by weight of a vinyl-containing polyphenylene ether resin, 1 part by weight to 30 parts by weight of a styrene-butadiene-styrene block copolymer and 0.5 part by weight to 30 parts by weight of a zinc molybdate-covered silica, wherein the zinc molybdate-covered silica has a mass ratio of zinc molybdate to silica of between 1:9 and 2:8.

For example, in one embodiment, the vinyl-containing polyphenylene ether resin comprises a vinylbenzyl-containing biphenyl polyphenylene ether resin, a methacrylate-containing polyphenylene ether resin or a combination thereof.

For example, in one embodiment, the styrene-butadiene-styrene block copolymer comprises a polymer with butadiene in the middle (such as a polymer of multiple butadiene units), and two terminals of the polymer are each terminated by a styrene, or two terminals of the polymer are each terminated by multiple styrenes. For example, but not limited thereto, the styrene-butadiene-styrene block copolymer may comprise a polymer in the form of $(styrene)_a$-$(butadiene)_b$-$(styrene)_c$, wherein a, b and c are the number of styrene repeating units at the first terminal, the number of butadiene repeating units in the middle, and the number of styrene repeating units at the second terminal, respectively, and the values are not particularly limited. The relationship between a, b, and c can be represented by the mass ratio of styrene unit to butadiene unit, for example, but not limited thereto, the styrene-butadiene-styrene block copolymer having a mass ratio (wt %) of styrene unit to butadiene unit of between 20:80 and 50:50, preferably a mass ratio (wt %) of styrene unit to butadiene unit of between 30:70 and 45:55. For example, in one embodiment, the styrene-butadiene-styrene block copolymer comprises a copolymer of styrene-butadiene-butadiene-butadiene-butadiene-butadiene-butadiene-styrene, a copolymer of styrene-styrene-styrene-butadiene-butadiene-butadiene-butadiene-styrene-styrene-styrene, a copolymer of styrene-butadiene-butadiene-butadiene-butadiene-butadiene-butadiene-butadiene-butadiene-butadiene-styrene-styrene or a combination thereof. The styrene-butadiene-styrene block copolymer may comprise a 1,2-vinyl group, a 1,4-vinyl group or a combination thereof; i.e., the styrene-butadiene-styrene block copolymer contains a reactive vinyl group, which may be further crosslinked with other crosslinking agents.

For example, in one embodiment, the zinc molybdate-covered silica has a particle size distribution D50 of between 2 μm and 4 μm, preferably between 2 μm and 3 μm, more preferably between 2 μm and 2.5 μm, but not limited thereto. The aforesaid particle size distribution D50 is the value of the particle diameter at 50% in the cumulative distribution of the filler (such as zinc molybdate-covered silica), as measured by using laser scattering, and it has a physical meaning that 50% of filler particles have a particle size of less than or equal to the particle size.

For example, in one embodiment, the resin composition further comprises bifunctional aliphatic long-chain acrylate. For example, in one embodiment, the bifunctional aliphatic long-chain acrylate comprises 1,6-hexanediol diacrylate.

For example, in one embodiment, the resin composition further comprises triallyl isocyanurate, triallyl cyanurate, maleimide resin, polyolefin different from the styrene-butadiene-styrene block copolymer, small molecule vinyl compound, epoxy resin, cyanate ester resin, phenolic resin, styrene maleic anhydride, polyester resin, amine curing agent, polyamide resin, polyimide resin or a combination thereof.

For example, in one embodiment, the resin composition further comprises inorganic filler, flame retardant, curing accelerator, polymerization inhibitor, solvent, silane coupling agent, coloring agent, toughening agent, or a combination thereof.

To achieve the above-mentioned objects, the present disclosure further provides an article made from the resin composition, including a prepreg, a resin film, a laminate or a printed circuit board.

For example, in one embodiment, articles made from the resin composition disclosed herein at least have one, more or all of the following properties:

- a gel time stability calculated according to a gel time as measured by reference to IPC-TM-650 2.3.18 of less than or equal to 32 seconds;
- a copper foil peeling strength as measured by reference to IPC-TM-650 2.4.8 of greater than or equal to 3.5 lb/in;
- a difference rate of dissipation factor of less than or equal to 40% calculated according to a dissipation factor as measured by reference to HS C2565 at 10 GHz;
- passing a conductive anodic filament test as conducted by reference to IPC-TM-650 2.6.25 at 1000V voltage for 250 hours; and
- passing a conductive anodic filament test as conducted by reference to IPC-TM-650 2.6.25 at 100V voltage for 1000 hours.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, or a combination of maleimide monomer(s) and maleimide polymer(s).

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, an oligomer, etc., but not limited thereto. Unless otherwise specified, according to the present disclosure, a homopolymer refers to the polymer formed by the polymerization of one monomer. Unless otherwise specified, according to the present disclosure, a copolymer refers to the product formed by two or more monomers via polymerization. For example, copolymers may comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBB-AAAAA-. Unless otherwise specified, the styrene-butadiene-styrene block copolymer of the present disclosure is a polymer obtained by subjecting a styrene monomer and a butadiene monomer to a copolymerization. As long as the styrene-butadiene-styrene block copolymer of the present disclosure is a block copolymer having this structure (containing styrene units at terminals and containing butadiene units in the middle), whether the units of the polymer main chain skeleton and side chain are modified or not is not particularly limited. In other words, a styrene-butadiene-styrene block copolymer may be modified, such as by maleic anhydride. Unless otherwise specified, according to the present disclosure, a prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, according to the present disclosure, a modification comprises a product derived from a resin with its reactive functional group modified, a product derived from a crosslinking reaction of a resin and other resins, a product derived from homopolymerizing a resin, a product derived from copolymerizing a resin and other resins, etc. For example, such as but not limited thereto, a modification may refer to replacing a hydroxyl group with a vinyl group via a chemical reaction, or obtaining a terminal hydroxyl group from a chemical reaction of a terminal vinyl group and p-aminophenol.

As used herein, "vinyl-containing" refers to the presence of an ethylenic carbon-carbon double bond (C=C) or a functional group derived therefrom in a compound. Therefore, examples of "vinyl-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl-containing polyphenylene ether resin represents a polyphenylene ether resin containing a vinyl group, an allyl group, a vinylbenzyl group, a methacrylate group or the like, but not limited thereto.

Unless otherwise specified, as used herein, part(s) by weight represents weight part(s) in any weight unit, such as but not limited to kilogram, gram, pound and so on. For example, 100 parts by weight of the maleimide resin may represent 100 kilograms of the maleimide resin or 100 pounds of the maleimide resin. If a resinous solution comprises solvent and resin, the part by weight of (solid or liquid) resin generally refers to the weight unit of the (solid or liquid) resin, not including the weight unit of the solvent in the solution, and the part by weight of the solvent refers to the weight unit of the solvent.

The following embodiments and examples are illustrative in nature and are not intended to limit the present disclosure and its application. In addition, the present disclosure is not bound by any theory described in the background and summary above or the following embodiments or examples.

As described above, a primary object of the present disclosure is to provide a resin composition, comprising 50 parts by weight of a vinyl-containing polyphenylene ether resin, 1 part by weight to 30 parts by weight of a styrene-butadiene-styrene block copolymer and 0.5 part by weight to 30 parts by weight of a zinc molybdate-covered silica, wherein the zinc molybdate-covered silica has a mass ratio of zinc molybdate to silica of between 1:9 and 2:8.

For example, in the resin composition, relative to 50 parts by weight of the vinyl-containing polyphenylene ether resin, the amount of the styrene-butadiene-styrene block copolymer may range from 1 part by weight to 30 parts by weight, such as but not limited to 1 part by weight, 2 parts by weight, 3 parts by weight, 5 parts by weight, 10 parts by weight, 20 parts by weight or 30 parts by weight of the styrene-butadiene-styrene block copolymer. For example, the resin composition comprises 50 parts by weight of the vinyl-containing polyphenylene ether resin and 6 parts by weight of the styrene-butadiene-styrene block copolymer.

For example, in the resin composition, relative to 50 parts by weight of the vinyl-containing polyphenylene ether resin, the amount of the zinc molybdate-covered silica may range from 0.5 part by weight to 30 parts by weight, such as but not limited to 0.5 part by weight, 0.6 part by weight, 1 part by weight, 2 parts by weight, 3 parts by weight, 5 parts by weight, 10 parts by weight, 20 parts by weight or 30 parts by weight of the zinc molybdate-covered silica. For example, the resin composition comprises 50 parts by weight of the vinyl-containing polyphenylene ether resin and 10 parts by weight of the zinc molybdate-covered silica.

In other words, in the resin composition of the present disclosure, relative to 50 parts by weight of the vinyl-containing polyphenylene ether resin, the amount of the styrene-butadiene-styrene block copolymer ranges from 1 part by weight to 30 parts by weight, and the amount of the zinc molybdate-covered silica ranges from 0.5 part by weight to 30 parts by weight.

For example, in one embodiment, the vinyl-containing polyphenylene ether resin may comprise various vinyl-containing polyphenylene ether resins known in the art to which this disclosure pertains. The vinyl-containing polyphenylene ether resin suitable for the present disclosure is not particularly limited and may comprise any one or more commercially available products, self-prepared products, or a combination thereof. Examples of the vinyl-containing polyphenylene ether resin may include but not limited to a polyphenylene ether resin containing a vinyl group, an allyl group, a vinylbenzyl group or a methacrylate group. For example, in one embodiment, the vinyl-containing polyphenylene ether resin comprises a vinylbenzyl-containing biphenyl polyphenylene ether resin, a methacrylate-containing polyphenylene ether resin (i.e., methacryloyl-containing polyphenylene ether resin), an allyl-containing polyphenylene ether resin, a vinylbenzyl-containing bisphenol A polyphenylene ether resin, a chain-extended vinyl-containing polyphenylene ether resin or a combination thereof. For example, the vinyl-containing polyphenylene ether resin may be a vinylbenzyl-containing biphenyl polyphenylene ether resin with a number average molecular weight of about 1200 (such as OPE-2st 1200, available from Mitsubishi Gas Chemical Co., Inc.), a vinylbenzyl-containing biphenyl polyphenylene ether resin with a number average molecular weight of about 2200 (such as OPE-2st 2200, available from Mitsubishi Gas Chemical Co., Inc.), a methacrylate-containing polyphenylene ether resin with a number average molecular weight of about 1900 to 2300 (such as SA9000, available from Sabic), a vinylbenzyl-containing bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

For example, in one embodiment, the styrene-butadiene-styrene block copolymer may comprise various styrene-butadiene-styrene block copolymers known in the art to which this disclosure pertains, which are as defined above. The styrene-butadiene-styrene block copolymer suitable for the present disclosure is not particularly limited and may comprise any one or more commercially available products, self-prepared products or a combination thereof. For example, in one embodiment, the styrene-butadiene-styrene block copolymer may be commercially available styrene-butadiene-styrene block copolymers such as T-411, T-432, T-437, T-438 or T-439 produced by Asahi KASEI, or D1101, D1102, D1116, D1118, D1152, D1153, D1184 or D1192 produced by KRATON.

According to the present disclosure, the zinc molybdate-covered silica refers to a silica with its surface at least partially covered by zinc molybdate, wherein the shape and size of silica are not particularly limited, and the method of covering the surface of silica with zinc molybdate is not particularly limited. For example, in one embodiment, the zinc molybdate-covered silica refers to a zinc molybdate particle adhered to the surface of a silica particle, and the surface of a silica particle may be adhered by multiple zinc molybdate particles, which form a cover layer on the surface of the silica particle. The adhesion method may use the conventional technique of adhering one inorganic filler to the surface of another inorganic filler, or it may also be a specific technique of covering the surface of silica with zinc molybdate.

In the zinc molybdate-covered silica of the present disclosure, the mass ratio of zinc molybdate to silica is between 1:9 and 2:8.

In the present disclosure, the size of zinc molybdate-covered silica is not particularly limited. For example, in one embodiment, the zinc molybdate-covered silica has a particle size distribution D50 of between 2 μm and 4 μm, preferably between 2 μm and 3 μm, and more preferably between 2 μm and 2.5 μm, but not limited thereto.

For example, in one embodiment, the zinc molybdate-covered silica may comprise a zinc molybdate-covered silica produced by Jinyi Silicon Materials Development Co., Ltd.

For example, in one embodiment, the resin composition of the present disclosure may further comprise a bifunctional aliphatic long-chain acrylate. For example, the bifunctional aliphatic long-chain acrylate may be for example an acrylate containing an aliphatic long chain of 5 or more carbon atoms and two acrylate groups.

In one embodiment, the bifunctional aliphatic long-chain acrylate has a structure as shown below:

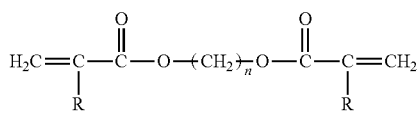

wherein n is an integer of greater than or equal to 5, and R is hydrogen or methyl group.

For example, n may be an integer of greater than or equal to 5 and less than or equal to 20, or preferably an integer of greater than or equal to 6 and less than or equal to 12. In one embodiment, the bifunctional aliphatic long-chain acrylate has an n value of 6, 8, 10, 12, 14, 16, 18, or 20, but not limited thereto. Unless otherwise specified, in the present disclosure, "long-chain" refers to an n value of greater than or equal to 5, and "bifunctional" refers to the presence of two acrylate groups.

Specifically, the aforesaid bifunctional aliphatic long-chain acrylate may be any one of the compounds shown by Formula (I) to (III) or a combination thereof:

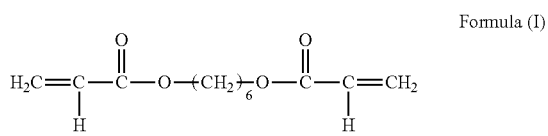

Formula (I)

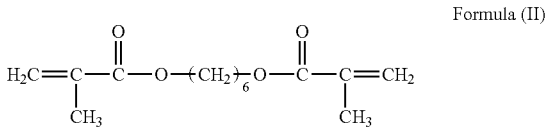

Formula (II)

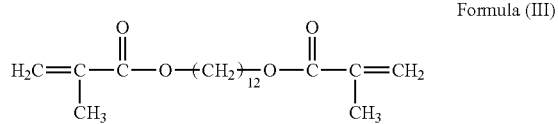

Formula (III)

For example, the bifunctional aliphatic long-chain acrylate of the present disclosure may comprise but not limited to 1,6-hexanediol diacrylate, 1,6-hexanediol dimethacrylate, 1,12-dodecanediol dimethacrylate or a combination thereof. For example, in one embodiment, the bifunctional aliphatic long-chain acrylate may be commercially available bifunctional aliphatic long-chain acrylate such as SR238, SR239 or SR262 produced by Sartomer.

In addition to the aforesaid vinyl-containing polyphenylene ether resin, styrene-butadiene-styrene block copolymer and zinc molybdate-covered silica, the resin composition of the present disclosure may further comprise a crosslinking agent. For example, in one embodiment, relative to 50 parts by weight of the vinyl-containing polyphenylene ether resin, the resin composition of the present disclosure may further comprise 1 part by weight to 60 parts by weight of a crosslinking agent, preferably 5 parts by weight to 50 parts by weight of a crosslinking agent.

For example, in one embodiment, the crosslinking agent comprises triallyl isocyanurate, triallyl cyanurate, maleimide resin, polyolefin different from the styrene-butadiene-styrene block copolymer, small molecule vinyl compound, epoxy resin, cyanate ester resin, phenolic resin, styrene maleic anhydride, polyester resin, amine curing agent, polyamide resin, polyimide resin or a combination thereof. For example, in one embodiment, relative to 50 parts by weight of the vinyl-containing polyphenylene ether resin, the resin composition of the present disclosure may further comprise 10 parts by weight of triallyl isocyanurate and 30 parts by weight of maleimide resin.

For example, in one embodiment, the resin composition of the present disclosure may optionally further comprise triallyl isocyanurate. Due to the low boiling point of triallyl isocyanurate, it will be completely volatilized or remain only a small amount (like a solvent) in the process (B-stage) of making an article (such as prepreg or resin film) from the resin composition. The amount of triallyl isocyanurate is not particularly limited. For example, in one embodiment, relative to 50 parts by weight of the vinyl-containing polyphenylene ether resin, the resin composition of the present disclosure may comprise 1 part by weight to 20 parts by weight of triallyl isocyanurate, such as 5 parts by weight to 15 parts by weight of triallyl isocyanurate, but not limited thereto.

For example, in one embodiment, the maleimide resin comprises a monomer containing at least one maleimide group or a combination thereof. Unless otherwise specified, the maleimide resin used in the present disclosure is not particularly limited and may include any one or more maleimide resins useful for preparing a prepreg, a resin film, a laminate or a printed circuit board. In some embodiments, any one or more of the maleimide resins below may be used: 4,4'-diphenylmethane bismaleimide, oligomer of phenylmethane maleimide (a.k.a. polyphenylmethane maleimide), bisphenol A diphenyl ether bismaleimide, 3,3'-dimethyl-5,5'-diethyl-4,4'-diphenylmethane bismaleimide (a.k.a. bis(3-ethyl-5-methyl-4-maleimide phenyl)methane), 3,3'-dimethyl-5,5'-dipropyl-4,4'-diphenylmethane bismaleimide, biphenyl maleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenylmaleimide, diethyl bismaleimidotoluene, vinyl benzyl maleimide (VBM), maleimide resin containing aliphatic long chain structure, or a combination thereof. Unless otherwise specified, the maleimide resins described above should be construed as including the modifications thereof.

For example, examples of the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry, products such as BMI-70 and BMI-80 available from K.I Chemical Industry Co., Ltd., products such as MIR-3000 and MIR-5000 available from Nippon Kayaku, or products such as DE-TDAB available from Evonik Industries.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

In addition to the styrene-butadiene-styrene block copolymer, the resin composition of the present disclosure may further comprise other polyolefin. For example, examples of other polyolefin described above include but are not limited to: styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer (a.k.a. styrene-ethylene-butene-styrene block polymer), styrene-isoprene copolymer, hydrogenated styrene-isoprene copolymer, hydrogenated styrene-butadiene-divinylbenzene terpolymer, polybutadiene (homopolymer of butadiene), maleic anhydride-butadiene copolymer, methyl styrene copolymer or a combination thereof. Preferably, other polyolefin comprises styrene-butadiene copolymer, hydrogenated styrene-butadiene copolymer, polybutadiene, styrene-butadiene-maleic anhydride terpolymer or maleic anhydride-butadiene copolymer. For example, the polybutadiene may comprise a polybutadiene without any reactive group, a hydrogenated polybutadiene, a hydroxyl-containing polybutadiene, a phenolic hydroxyl-containing polybutadiene (having a polybutadiene structure and containing a phenolic hydroxyl group), a carboxyl-containing polybutadiene, an anhydride-containing polybutadiene, an epoxy-containing polybutadiene, an isocyanate-containing polybutadiene, an urethane-containing polybutadiene, a hydrogenated polybutadiene with its terminal hydroxyl groups modified by vinyl groups (therefore without any hydroxyl group) or a combination thereof. For example, the polybutadiene may comprise an epoxy-containing polybutadiene.

For example, the small molecule vinyl compound as used herein refers to a vinyl-containing compound with a molecular weight of less than or equal to 1000, preferably between 100 and 900 and more preferably between 100 and 800. According to the present disclosure, the small molecule vinyl compound may include but not limited to any one of divinylbenzene (DVB), bis(vinylbenzyl) ether (BVBE), 1,2,4-trivinyl cyclohexane (TVCH), diallyl isophthalate (DAIP), diallyl bisphenol A (DABPA) or a combination thereof.

For example, the epoxy resin may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin or naphthalene ether epoxy resin), benzofuran epoxy resin, and isocyanate-modified epoxy resin. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, the cyanate ester resin may include any one or more cyanate ester resins useful for preparing a prepreg, a resin film, a laminate or a printed circuit board, such as a compound having an Ar—O—C≡N structure, wherein Ar may be a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be phenol novolac cyanate ester resin, bisphenol A novolac cyanate ester resin, bisphenol F novolac cyanate ester resin or a combination thereof. For example, the cyanate ester resin may be available under the product name Primaset PT-15, PT-30S, PT-60S, BA-200, BA-230S, BA-3000S, BTP-2500, BTP-6020S, DT-4000, DT-7000, ULL950S, HTL-300, CE-320, LUT-50, or LeCy sold by Lonza.

For example, the phenolic resin may comprise but not limited to mono-functional, bifunctional or multifunctional phenolic resin, comprising phenolic resin of a resin composition conventionally used for making prepregs, such as phenoxy resin, novolac resin, etc.

For example, in the styrene maleic anhydride described above, the ratio of styrene (S) to maleic anhydride (MA) may be 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope.

For example, the polyester resin may be prepared by esterification of dicarboxylic aromatic compounds with dihydroxyl aromatic compounds. Examples of the polyester resin include, but not limited to, HPC-8000, HPC-8150 or HPC-8200 available from D.I.C. Corporation.

For example, the amine curing agent may include, but not limited to, any one or a combination of diamino diphenyl sulfone, diamino diphenyl methane, diamino diphenyl ether, diamino diphenyl sulfide and dicyandiamide.

For example, the polyamide resin may be any polyamide resin known in the field to which this disclosure pertains, including but not limited to various commercially available polyamide resin products.

For example, the polyimide resin may be any polyimide resin known in the field to which this disclosure pertains, including but not limited to various commercially available polyimide resin products.

In addition to the aforesaid components, the resin composition disclosed herein may also further optionally comprise inorganic filler, flame retardant, curing accelerator, polymerization inhibitor, solvent, silane coupling agent, coloring agent, toughening agent, or a combination thereof.

For example, the inorganic filler may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, zirconium tungstate, petaliteor, calcined kaolin or a combination thereof. Moreover, the inorganic filler can be spherical, fibrous, plate-like, particulate, flake-like or whisker-like in shape and can be optionally pretreated by a silane coupling agent. For example, in one embodiment, relative to 50 parts by weight of the vinyl-containing polyphenylene ether resin, the resin composition of the present disclosure may further comprise 10 parts by weight to 200 parts by weight of inorganic filler, preferably 50 parts by weight to 150 parts by weight of inorganic filler, but not limited thereto.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), and a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac). For example, in one embodiment, relative to 50 parts by weight of the vinyl-containing polyphenylene ether resin, the resin composition of the present disclosure may further comprise 10 parts by weight to 100 parts by weight of flame retardant, preferably 20 parts by weight to 80 parts by weight of flame retardant, but not limited thereto.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof. For example, in one embodiment, relative to 50 parts by weight of the vinyl-containing polyphenylene ether resin, the resin composition of the present disclosure may further comprise 0.001 part by weight to 2 parts by weight of curing accelerator, preferably 0.01 part by weight to 1.5 parts by weight of curing accelerator, but not limited thereto.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butyl phenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like. For example, in one embodiment, relative to 50 parts by weight of the vinyl-containing polyphenylene ether resin, the resin composition of the present disclosure may further comprise 0.001 part by weight to 5 parts by weight of polymerization inhibitor, preferably 0.01 part by weight to 3 parts by weight of polymerization inhibitor, but not limited thereto.

For example, the solvent suitable for the resin composition of the present disclosure is not particularly limited and may be any solvent suitable for dissolving the resin composition disclosed herein, examples including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol monomethyl ether acetate, or a mixture thereof. For example, in one embodiment, relative to 50 parts by weight of the vinyl-containing polyphenylene ether resin, the resin composition of the present disclosure may further comprise 20 parts by weight to 200 parts by weight of solvent, preferably 70 parts by weight to 180 parts by weight of solvent or 140 parts by weight to 170 parts by weight of solvent, but not limited thereto.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane. For example, in one embodiment, relative to 50 parts by weight of the vinyl-containing polyphenylene ether resin, the resin composition of the present disclosure may further comprise 0.001 part by weight to 2 parts by weight of silane coupling agent, preferably 0.01 part by weight to 1 part by weight of silane coupling agent, but not limited thereto.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof. For example, in one embodiment, relative to 50 parts by weight of the vinyl-containing polyphenylene ether resin, the resin composition of the present disclosure may further comprise 1 part by weight to 20 parts by weight of toughening agent, preferably 3 parts by weight to 10 parts by weight of toughening agent, but not limited thereto.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making a prepreg may be for example 120° C. to 180° C., preferably 120° C. to 160° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 240° C. and preferably between 200° C. and 230° C. and a suitable curing time being 90 to 180 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment, the resin composition disclosed herein may achieve improvement in one or more of the following properties: gel time stability, copper foil peeling strength, difference rate of dissipation factor, conductive anodic filament test, peeling strength between prepreg and core and difference rate of dielectric constant.

For example, the resin composition according to the present disclosure or the article made therefrom may achieve one, more or all of the following properties:
a gel time stability calculated according to a gel time as measured by reference to IPC-TM-650 2.3.18 of less than or equal to 32 seconds, such as between 7 seconds and 32 seconds;
a copper foil peeling strength as measured by reference to IPC-TM-650 2.4.8 of greater than or equal to 3.5 lb/in, such as between 3.5 lb/in and 4.5 lb/in;

a difference rate of dissipation factor of less than or equal to 40%, calculated according to a dissipation factor as measured by reference to JIS C2565 at 10 GHz, such as between 18% and 40%;

passing a conductive anodic filament test as conducted by reference to IPC-TM-650 2.6.25 at 1000V voltage for 250 hours; and passing a conductive anodic filament test as conducted by reference to IPC-TM-650 2.6.25 at 100V voltage for 1000 hours.

For example, the resin composition according to the present disclosure or the article made therefrom may achieve one, more or all of the following properties:

a peeling strength between prepreg and core of greater than or equal to 3.0 lb/in, such as a peeling strength between prepreg and core of between 3.0 lb/in and 4.8 lb/in; and a difference rate of dielectric constant of less than or equal to 5%, calculated according to a dielectric constant as measured by reference to JIS C2565 at 10 GHz, such as between 1% and 5%.

Raw materials below were used to prepare the resin compositions of various Examples and Comparative Examples of the present disclosure according to the amount listed in Table 1 to Table 3 and further fabricated to prepare test samples.

Materials and reagents used in Examples and Comparative Examples disclosed herein are listed below:

OPE-2st: vinylbenzyl-containing biphenyl polyphenylene ether resin, OPE-2st 2200, available from Mitsubishi Gas Chemical Co., Inc.

SA9000: methacrylate-containing polyphenylene ether resin, available from Sabic.

T-439: styrene-butadiene-styrene block copolymer (SBS), available from Asahi KASEI. The mass ratio of styrene unit to butadiene unit is 45:55.

D-1118: styrene-butadiene-styrene block copolymer (SBS), available from KRATON. The mass ratio of styrene unit to butadiene unit is 30:70.

M1911: hydrogenated styrene-butadiene-styrene block copolymer (SEBS), available from Asahi KASEI.

H1051: hydrogenated styrene-butadiene-styrene block copolymer (SEBS), available from Asahi KASEI.

Zinc molybdate-covered silica: having a mass ratio of zinc molybdate to silica of 2:8 and a particle size distribution D50 of between 2 μm and 4 μm, available from Jinyi Silicon Materials Development Co., Ltd.

Zinc molybdate-covered silica: having a mass ratio of zinc molybdate to silica of 1:9 and a particle size distribution D50 of between 2 μm and 4 μm, available from Jinyi Silicon Materials Development Co., Ltd.

911C: zinc molybdate-covered talc, having a mass ratio of zinc molybdate to talc of 2:8 and a particle size distribution D50 of between 2 μm and 4 μm, available from Kemguard.

MZM: zinc molybdate-covered magnesium hydroxide, having a mass ratio of zinc molybdate to magnesium hydroxide of 2:8 and a particle size distribution D50 of between 2 μm and 4 μm, available from Kemguard.

LB398: zinc molybdate-covered aluminum hydroxide, having a mass ratio of zinc molybdate to aluminum hydroxide of 2:8 and a particle size distribution D50 of between 2 μm and 4 μm, available from Kemguard.

Zinc molybdate: available from Amaybio.

SC2050 SMJ: spherical silica pre-treated by acrylic silane coupling agent, available from Admatechs.

SR238: 1,6-hexanediol diacrylate, available from Sartomer.

BMI-70: bis(3-ethyl-5-methyl-4-maleimidophenyl)methane, available from K.I Chemical Industry Co., Ltd.

TAIC: triallyl isocyanurate, commercially available.

SC2500 SVJ: spherical silica pre-treated by silane coupling agent, available from Admatechs.

25B: 2,5-dimethyl-2,5-di(t-butylperoxy)-3-hexyne, available from NOF Corporation. Toluene: commercially available.

MEK: methyl ethyl ketone, commercially available.

Compositions and test results of resin compositions of Examples and Comparative Examples are listed below (in part by weight):

TABLE 1

Resin compositions of Examples (in part by weight) and test results

| Component | Name | E1 | E2 | E3 | E4 | E5 |
|---|---|---|---|---|---|---|
| vinyl-containing polyphenylene ether resin | OPE-2St | 15 | 15 | 15 | 5 | 15 |
| | SA9000 | 35 | 35 | 35 | 35 | 35 |
| styrene-butadiene-styrene block copolymer | T-439 | 18 | 1 | 30 | 18 | 18 |
| | D-1118 | | | | | |
| other polyolefin | M1911 | | | | | |
| | H1051 | | | | | |
| zinc molybdate-covered silica (having a mass ratio of 2:8) | | 10 | 10 | 10 | 0.5 | 30 |
| zinc molybdate-covered silica (having a mass ratio of 1:9) | | | | | | |
| other inorganic filler | 911C | | | | | |
| | MZM | | | | | |
| | LB398 | | | | | |
| | zinc molybdate | | | | | |
| | SC2050 SMJ | | | | | |
| bifunctional aliphatic long-chain acrylate | SR238 | | | | | |
| maleimide resin | BMI-70 | | | | | |
| triallyl isocyanurate | TAIC | 10 | 10 | 10 | 10 | 10 |
| other inorganic filler | SC2050 SVJ | 100 | 100 | 100 | 100 | 100 |
| curing accelerator | 25B | 0.3 | 0.3 | 0.3 | 0.3 | 0.3 |
| solvent | toluene | 130 | 130 | 130 | 130 | 130 |
| | MEK | 30 | 30 | 30 | 30 | 30 |

| Property | Unit | E1 | E2 | E3 | E4 | E5 |
|---|---|---|---|---|---|---|
| gel time stability | second | 28 | 14 | 31 | 26 | 18 |
| copper foil peeling strength | lb/in | 3.9 | 3.5 | 4.2 | 3.8 | 3.8 |
| difference rate of dissipation factor | % | 22 | 40 | 18 | 21 | 24 |
| conductive anodic filament test (1000 V/250 hours) | none | pass | pass | pass | pass | pass |
| conductive anodic filament test (100 V/1000 hours) | none | pass | pass | pass | pass | pass |
| peeling strength between prepreg and core | lb/in | 4.8 | 3.0 | 4.8 | 4.7 | 3.5 |
| difference rate of dielectric constant | % | 1 | 5 | 1 | 1 | 1 |

TABLE 2

Resin compositions of Examples (in part by weight) and test results

| Component | Name | E6 | E7 | E8 | E9 |
|---|---|---|---|---|---|
| vinyl-containing polyphenylene ether resin | OPE-2St | 15 | 15 | 30 | 20 |
| | SA9000 | 35 | 35 | 20 | 30 |
| styrene-butadiene-styrene block copolymer | T-439 | 18 | 18 | 10 | 5 |
| | D-1118 | | | 8 | 15 |

TABLE 2-continued

Resin compositions of Examples (in part by weight) and test results

| Component | Name | | | | |
|---|---|---|---|---|---|
| other polyolefin | M1911 | | | | |
|  | H1051 | | | | |
| zinc molybdate-covered silica (having a mass ratio of 2:8) | | 10 | 10 | 8 | 15 |
| zinc molybdate-covered silica (having a mass ratio of 1:9) | | | | 12 | 5 |
| other inorganic filler | 911C | | | | |
|  | MZM | | | | |
|  | LB398 | | | | |
|  | zinc molybdate | | | | |
|  | SC2050 SMJ | | | | |
| bifunctional aliphatic long-chain acrylate | SR238 | 1 | 10 | 4 | 8 |
| maleimide resin | BMI-70 | | | 30 | 30 |
| triallyl isocyanurate | TAIC | 10 | 10 | 5 | 15 |
| other inorganic filler | SC2050 SVJ | 100 | 100 | 50 | 150 |
| curing accelerator | 25B | 0.3 | 0.3 | 0.1 | 0.6 |

TABLE 2-continued

Resin compositions of Examples (in part by weight) and test results

| | | | | | |
|---|---|---|---|---|---|
| solvent | toluene | 130 | 130 | 70 | 150 |
|  | MEK | 30 | 30 | 70 | 20 |
| Property | Unit | E6 | E7 | E8 | E9 |
| gel time stability | second | 32 | 32 | 7 | 13 |
| copper foil peeling strength | lb/in | 4.0 | 4.0 | 4.5 | 3.8 |
| difference rate of dissipation factor | % | 26 | 26 | 31 | 34 |
| conductive anodic filament test (1000 V/250 hours) | none | pass | pass | pass | pass |
| conductive anodic filament test (100 V/1000 hours) | none | pass | pass | pass | pass |
| peeling strength between prepreg and core | lb/in | 4.8 | 4.8 | 4.6 | 4.8 |
| difference rate of dielectric constant | % | 1 | 1 | 3 | 3 |

TABLE 3

Resin compositions of Comparative Examples (in part by weight) and test results

| Component | Name | C1 | C2 | C3 | C4 | C5 | C6 |
|---|---|---|---|---|---|---|---|
| vinyl-containing polyphenylene ether resin | OPE-2St | 15 | 15 | 15 | 15 | 15 | 15 |
|  | SA9000 | 35 | 35 | 35 | 35 | 35 | 35 |
| styrene-butadiene-styrene block copolymer | T-439 D-1118 | | | 18 | 18 | 18 | 18 |
| other polyolefin | M1911 | 18 | | | | | |
|  | H1051 | | 18 | | | | |
| zinc molybdate-covered silica (having a mass ratio of 2:8) | | 10 | 10 | | | | |
| zinc molybdate-covered silica (having a mass ratio of 1:9) | | | | | | | |
| other inorganic filler | 911C | | | | 10 | | |
|  | MZM | | | | | 10 | |
|  | LB398 | | | | | | 10 |
|  | zinc molybdate | | | | | | 3 |
|  | SC2050 SMJ | | | | | | 27 |
| bifunctional aliphatic long-chain acrylate | SR238 | | | | | | |
| maleimide resin | BMI-70 | | | | | | |
| triallyl isocyanurate | TAIC | 10 | 10 | 10 | 10 | 10 | 10 |
| other inorganic filler | SC2050 SVJ | 100 | 100 | 100 | 100 | 100 | 100 |
| curing accelerator | 25B | 0.3 | 0.3 | 0.3 | 0.3 | 0.3 | 0.3 |
| solvent | toluene | 130 | 130 | 130 | 130 | 130 | 130 |
|  | MEK | 30 | 30 | 30 | 30 | 30 | 30 |
| Property | Unit | C1 | C2 | C3 | C4 | C5 | C6 |
| gel time stability | second | 24 | 23 | 28 | 58 | 34 | 28 |
| copper foil peeling strength | lb/in | 3.0 | 2.9 | 2.4 | 3.9 | 3.9 | 3.8 |
| difference rate of dissipation factor | % | 14 | 14 | 55 | 36 | 50 | 33 |
| conductive anodic filament test (1000 V/250 hours) | none | pass | pass | pass | fail | fail | fail |
| conductive anodic filament test (100 V/1000 hours) | none | pass | pass | pass | fail | fail | fail |
| peeling strength between prepreg and core | lb/in | 2.8 | 2.8 | 2.8 | 4.7 | 4.8 | 2.7 |
| difference rate of dielectric constant | % | 1 | 1 | 1 | 7 | 4 | 2 |

Samples (specimens) for the properties measured above were prepared as described below and tested and analyzed under specified conditions below.

1. Prepreg (PP): Resin composition (in part by weight) from each Example (E1-E9) or each Comparative Example (C1-C6) was separately added to a stirred tank and well-mixed to form a varnish. Then the varnish was loaded to an impregnation tank, and a fiberglass fabric (e.g., 1080 and 2116 E-glass fiber fabrics, available from Asahi) was impregnated into the impregnation tank to adhere the resin composition onto the fiberglass fabric, followed by heating and baking at 140-160° C. for about 2 minutes to obtain a prepreg. Prepregs made from 1080 E-glass fiber fabric have a resin content of about 65%, and prepregs made from 2116 E-glass fiber fabric have a resin content of about 55%.

2. Copper-containing laminate 1 (i.e., copper-clad laminate 1, formed by lamination of two prepregs): Two 18 μm reverse treatment foils (RTF3) and two prepregs obtained from 1080 E-glass fiber fabric impregnated with each Example or Comparative Example were prepared, each prepreg having a resin content of about 65%. A copper foil, two prepregs and a copper foil were superimposed in such order and then subjected to a vacuum condition for lamination at 30 kgf/cm$^2$ pressure and 215° C. for 90 minutes to form each copper-containing laminate 1. Insulation layers were formed by laminating two sheets of prepreg between the two copper foils, and the resin content of the insulation layers is about 65%.

3. Copper-containing laminate 2 (formed by lamination of six prepregs): Two 18 μm reverse treatment foils (RTF3) and six prepregs obtained from 2116 E-glass fiber fabric impregnated with each Example or Comparative Example were prepared, each prepreg having a resin content of about 55%. A copper foil, six prepregs and a copper foil were superimposed in such order and then subjected to a vacuum condition for lamination at 30 kgf/cm$^2$ pressure and 215° C. for 90 minutes to form each copper-containing laminate 2. Insulation layers were formed by laminating six sheets of prepreg between the two copper foils, and the resin content of the insulation layers is about 55%.

4. Copper-containing laminate 3 (formed by lamination of eight prepregs): Two 18 μm reverse treatment foils (RTF3) and eight prepregs obtained from 2116 E-glass fiber fabric impregnated with each Example or Comparative Example were prepared, each prepreg having a resin content of about 55%. A copper foil, eight prepregs and a copper foil were superimposed in such order and then subjected to a vacuum condition for lamination at 30 kgf/cm$^2$ pressure and 215° C. for 90 minutes to form each copper-containing laminate 3. Insulation layers were formed by laminating eight sheets of prepreg between the two copper foils, and the resin content of the insulation layers is about 55%.

5. Copper-free laminate 1 (formed by lamination of two prepregs): Each aforesaid copper-containing laminate 1 was etched to remove the two copper foils to obtain a copper-free laminate 1 (formed by lamination of two prepregs), having a resin content of about 65%.

6. Copper-free laminate 2 (formed by lamination of six prepregs): Each aforesaid copper-containing laminate 2 was etched to remove the two copper foils to obtain a copper-free laminate 2 (formed by lamination of six prepregs), having a resin content of about 55%.

7. Copper-free laminate 3 (formed by lamination of eight prepregs): Each aforesaid copper-containing laminate 3 was etched to remove the two copper foils to obtain a copper-free laminate 3 (formed by lamination of eight prepregs), having a resin content of about 55%.

8. Copper-containing laminate 4: Two 35 μm reverse treatment foils (RTF3), two half-folded copper foils (the type of copper foil is not limited; the reverse treatment foils used herein are the same as described above, and the shiny side of the copper foil is folded inward in half) and two prepregs obtained from 2116 E-glass fiber fabric impregnated with each Example or Comparative Example were prepared, each prepreg having a resin content of about 55%. An aforesaid reverse treatment foil, a prepreg, a copper-free laminate 3 (as a core), a prepreg and a reverse treatment foil were superimposed in such order, and the two half-folded copper foils were inserted into the interfaces between the prepregs and the copper-free laminate 3, respectively, wherein the insertion depth of the half-folded copper foils was 1 inch; i.e., a reverse treatment foil, a prepreg, an inserted half-folded copper foil, a copper-free laminate 3 (as a core), an inserted half-folded copper foil, a prepreg and a reverse treatment foil were superimposed in such order and then subjected to a vacuum condition for lamination at 30 kgf/cm$^2$ pressure and 215° C. for 90 minutes to form each copper-containing laminate 4. The main purpose of half-folded copper foil is to clearly define the interface between prepreg and core during the peeling strength test between prepreg and core, and it is beneficial to separate the interface for the peeling strength test.

9. Copper-containing laminate 5 (formed by lamination of one prepreg): Two 35 μm reverse treatment foils (RTF3) and a prepreg obtained from 2116 E-glass fiber fabric impregnated with each Example or Comparative Example were prepared, each prepreg having a resin content of about 55%. A copper foil, a prepreg and a copper foil were superimposed in such order and then subjected to a vacuum condition for lamination at 30 kgf/cm$^2$ pressure and 215° C. for 90 minutes to form each copper-containing laminate 5. A prepreg was cured to form an insulation layer between the two copper foils, and the insulation layer has a resin content of about 55%.

10. Copper-containing laminate 6: Two 35 μm reverse treatment foils (RTF3) and eight prepregs obtained from 1080 E-glass fiber fabric impregnated with each Example or Comparative Example were prepared, each prepreg having a resin content of about 65%. An aforesaid copper foil, two prepregs, a copper-containing laminate 5, two prepregs, a copper-containing laminate 5, two prepregs, a copper-containing laminate 5, two prepregs and a copper foil were superimposed in such order and then subjected to a vacuum condition for lamination at 30 kgf/cm$^2$ pressure and 215° C. for 90 minutes to form each copper-containing laminate 6.

Test items and test methods are described below.

Gel Time Stability

Resin compositions from Examples E1-E9 and Comparative Examples C1-C6 (in part by weight) were respectively used and components of the resin compositions were added to a stirred tank, stirred homogeneously and well mixed to form varnish samples to be tested by reference to the processes described in IPC-TM-650 2.3.18; 50 mL of each sample was placed on a cure plate of 181±0.5° C., the tapered end of a stick was stroked circularly from the center of the varnish sample toward the periphery, and the diameter of varnish area was maintained at 1.90 to 2.19 cm. Stroking was continued when the varnish became stiff until the largest piece broke up, and the timer was stopped immediately to record the time, unit being accurate to second, which was the first gel time defined as S/G1. After each sample was placed at room temperature (25° C.) for 7 days, the varnish of each sample was well mixed and stirred to make the inorganic filler in the resin composition uniformly disperse instead of settling at the bottom of the sample, and then measured according to the aforementioned gel time measurement method to obtain the second gel time defined as S/G2. Gel time stability is defined as the variation (ΔS/G) between the second gel time and the first gel time. For example, gel time stability is equal to the second gel time minus the first gel time.

In the technical field to which the present disclosure pertains, lower gel time variation ΔS/G represents better gel time stability. A difference in gel time stability of greater than or equal to 10 seconds represents a substantial difference (i.e., significant technical difficulty) in gel time stability in different varnishes. For example, articles made from the resin composition disclosed herein have a gel time stability calculated according to a gel time as measured by reference to IPC-TM-650 2.3.18 of less than or equal to 32 seconds, such as between 7 seconds and 32 seconds.

Copper Foil Peeling Strength (a.k.a. Peeling Strength, P/S)

In the copper foil peeling strength test, the copper-containing laminate 2 (obtained by laminating six prepregs, having a resin content of about 55%) was cut into a rectangular specimen with a width of 24 mm and a length of greater than 60 mm, which was etched to remove surface copper foil, leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate.

In the technical field to which the present disclosure pertains, higher copper foil peeling strength is better. A difference in copper foil peeling strength of greater than or equal to 0.3 lb/in represents a substantial difference (i.e., significant technical difficulty) in copper foil peeling strength in different laminates. For example, articles made from the resin composition disclosed herein have a copper foil peeling strength as measured by reference to IPC-TM-650 2.4.8 of greater than or equal to 3.5 lb/in, such as between 3.5 lb/in and 4.5 lb/in.

Difference Rate of Dissipation Factor

In the calculation of difference rate of dissipation factor, the aforesaid copper-free laminate 1 (obtained by laminating two prepregs, having a resin content of about 65%) was chosen as a sample. Each sample was measured by reference to JIS C2565 at room temperature (about 25° C.) and at 10 GHz, from which a first dissipation factor was obtained and defined as Df1. In addition, the same sample was then placed at a constant temperature of 168° C. for 7 days, and following the process of measuring the first dissipation factor, the sample after having been subjected to a temperature of 168° C. for 7 days was then measured again to obtain a second dissipation factor, which is defined as Df2. The difference rate of dissipation factor (%) is defined as the ratio of increase of the second dissipation factor relative to the first dissipation factor. For example, the difference rate of dissipation factor is equal to [(Df2−Df1)/Df1]*100%.

In the technical field to which the present disclosure pertains, lower difference rate of dissipation factor is better. A difference in difference rate of dissipation factor of greater than or equal to 3% represents a substantial difference (i.e., significant technical difficulty) in difference rate of dissipation factor in different laminates. For example, articles made from the resin composition disclosed herein have a difference rate of dissipation factor calculated according to a dissipation factor as measured by reference to JIS C2565 at 10 GHz of less than or equal to 40%, such as between 18% and 40%.

Conductive Anodic Filament Test (1000V/250 Hours)

Conductive anodic filament test (1000V/250 hours) is also known as CAF test (1000V/250 hours). The aforesaid copper-containing laminate 6 was chosen and processed by conventional trace formation processes of printed circuit board to provide a circuit board sample, and the trace has a pitch of 1.6 mm and 50 through holes with an inner wall interval of 2.1 mm and an inner diameter of 0.4 mm. A 1000V voltage was applied to the sample under a temperature of 85° C. and a relative humidity (RH) of 85% for 250 hours in the test. Each sample was tested by a conductive anodic filament test as conducted by reference to IPC-TM-650 2.6.25. If the test at 1000V for 250 hours does not result in failure (representing no conductive anode filaments are generated, that is, no cation migration occurs), a designation of "pass" is given; if the test at 1000V for 250 hours results in failure (representing conductive anode filaments are generated, that is, cation migration occurs), a designation of "fail" is given.

Conductive Anodic Filament Test (100V/1000 Hours)

Conductive anodic filament test (100V/1000 hours) is also known as CAF (100V/1000 hours). The aforesaid copper-containing laminate 6 was chosen and processed by conventional trace formation processes of printed circuit board to provide a circuit board sample, and the trace has a pitch of 0.2 mm and 50 through holes with an inner wall interval of 0.3 mm and an inner diameter of 0.3 mm. A 100V voltage was applied to the sample under a temperature of 85° C. and a relative humidity (RH) of 85% for 1000 hours in the test. Each sample was tested by a conductive anodic filament test as conducted by reference to IPC-TM-650 2.6.25. If the test at 100V for 1000 hours does not result in failure, a designation of "pass" is given; if the test at 100V for 1000 hours results in failure, a designation of "fail" is given.

Peeling Strength Between Prepreg and Core (i.e., the Bonding Strength Between Cured Prepreg and Adjacent Core)

In the test of peeling strength between prepreg and core, the copper-containing laminate 4 was cut into a rectangle with a width of 0.5 inch and a length of 5 inch according to the position of the half-folded copper foil. Along the position of the layer separation by the folded copper foil, the interface between prepreg (PP) and core was lifted and pulled apart, followed by using a tensile strength tester at room temperature (about 25° C.) to measure the force (lb/in) required to separate the two layers between the cured prepreg (i.e., semi-cured state (B-stage) prepreg prior to lamination) and its adjacent core already cured prior to lamination.

Peeling strength between prepreg and core is different from the conventional copper foil peeling strength or interlayer peeling strength. Copper foil peeling strength is the force required to separate an insulation layer of a copper-clad laminate and its adjacent outer copper foil; interlayer peeling strength is the force required to separate the interface between two adjacent prepregs (i.e., two adjacent prepregs prior to curing) in an inner insulation layer of a copper-clad laminate. Copper foil peeling strength and interlayer peeling strength, both associated to a prepreg in semi-cured state cured at high temperature and high pressure by crosslinking a prepreg containing a resin composition still having crosslinking ability (in B-stage) with a copper foil or an adjacent prepreg (also having crosslinking ability) respectively during the lamination, have stronger peeling strength (the force required to separate the two is stronger). The aforesaid peeling strength between prepreg and core is the force required for separating a prepreg from a core without crosslinking ability (in C-stage) when cured at high temperature and high pressure. Therefore, a general copper-clad laminate has a copper foil peeling strength and an interlayer peeling strength greater than its peeling strength between prepreg and core; that is, a strong copper foil peeling strength and a strong interlayer peeling strength may not necessarily have a strong peeling strength between prepreg and core at the same time.

In the technical field to which the present disclosure pertains, higher peeling strength between prepreg and core is better, representing the interface between cured prepreg of the copper-containing laminate 4 and its adjacent core has a stronger bonding strength. A difference in peeling strength between prepreg and core of greater than or equal to 0.2 lb/in represents a substantial difference (i.e., significant technical difficulty) in peeling strength between prepreg and core in different laminates. For example, articles made from the resin composition disclosed herein have a peeling strength between prepreg and core of greater than or equal to 3.0 lb/in, such as between 3.0 lb/in and 4.8 lb/in.

Difference Rate of Dielectric Constant

In the calculation of difference rate of dielectric constant, the aforesaid copper-free laminate 1 (obtained by laminating two prepregs, having a resin content of about 65%) was chosen as a sample. Each sample was measured by using a microwave dielectrometer (available from AET Corp.) by reference to JIS C2565 at room temperature (about 25° C.) and at 10 GHz, from which a first dielectric constant was obtained and defined as Dk1. In addition, the same sample was then placed at a constant temperature of 168° C. for 7 days, and following the process of measuring the first dielectric constant, the sample after having been subjected to a temperature of 168° C. for 7 days was then measured again to obtain a second dielectric constant, which is defined as Dk2. The difference rate of dielectric constant is defined as the ratio of increase of the second dielectric constant relative to the first dielectric constant, in %. For example, the difference rate of dielectric constant is equal to [(Dk2−Dk1)/Dk1]*100%.

In the technical field to which the present disclosure pertains, lower difference rate of dielectric constant is better. A difference in the difference rate of dielectric constant of greater than or equal to 1% represents a substantial difference (i.e., significant technical difficulty) in the difference rate of dielectric constant in different laminates. For example, articles made from the resin composition disclosed herein have a difference rate of dielectric constant calculated according to a dielectric constant as measured by reference to JIS C2565 at 10 GHz of less than or equal to 5%, such as between 1% and 5%.

The following observations can be made from Table 1 to Table 3.

Resin compositions comprising 50 parts by weight of a vinyl-containing polyphenylene ether resin, 1 part by weight to 30 parts by weight of a styrene-butadiene-styrene block copolymer and 0.5 part by weight to 30 parts by weight of a zinc molybdate-covered silica, such as Examples E1 to E9, can all achieve at the same time the properties including a gel time stability of less than or equal to 32 seconds, a copper foil peeling strength of greater than or equal to 3.5 lb/in, a difference rate of dissipation factor of less than or equal to 40%, passing a conductive anodic filament test (1000V/250 hours) and passing a conductive anodic filament test (100V/1000 hours). In contrast, Comparative Examples C1 to C6 fail to achieve desirable results in at least one of gel time stability, copper foil peeling strength, difference rate of dissipation factor, conductive anodic filament test (1000V/250 hours) and conductive anodic filament test (100V/1000 hours).

In contrast to Examples E1 to E9, if the resin composition does not contain the styrene-butadiene-styrene block copolymer as disclosed herein but contains a different polyolefin, such as a hydrogenated styrene-butadiene-styrene block copolymer in Comparative Examples C1 and C2, desirable improvement in peeling strength between prepreg and core and copper foil peeling strength was not achieved.

In contrast to Examples E1 to E9, if the resin composition does not contain the zinc molybdate-covered silica as disclosed herein but contains a zinc molybdate-covered talc, such as Comparative Example C3, desirable improvement in peeling strength between prepreg and core, copper foil peeling strength and difference rate of dissipation factor was not achieved.

In contrast to Examples E1 to E9, if the resin composition does not contain the zinc molybdate-covered silica as disclosed herein but contains a zinc molybdate-covered magnesium hydroxide, such as Comparative Example C4, desirable improvement in gel time stability, difference rate of dielectric constant, conductive anodic filament test (1000V/250 hours) and conductive anodic filament test (100V/1000 hours) was not achieved.

In contrast to Examples E1 to E9, if the resin composition does not contain the zinc molybdate-covered silica as disclosed herein but contains a zinc molybdate-covered aluminum hydroxide, such as Comparative Example C5, desirable improvement in difference rate of dissipation factor, conductive anodic filament test (1000V/250 hours) and conductive anodic filament test (100V/1000 hours) was not achieved.

In contrast to Examples E1 to E9, if the resin composition does not contain the zinc molybdate-covered silica as disclosed herein but contains two inorganic fillers, such as zinc molybdate and silica, such as Comparative Example C6, desirable improvement in peeling strength between prepreg and core, conductive anodic filament test (1000V/250 hours) and conductive anodic filament test (100V/1000 hours) was not achieved.

Overall, the resin composition of the present disclosure can achieve at the same time desirable properties including a gel time stability of less than or equal to 32 seconds, a copper foil peeling strength of greater than or equal to 3.5 lb/in, a difference rate of dissipation factor of less than or equal to 40%, passing a conductive anodic filament test (1000V/250 hours), passing a conductive anodic filament test (100V/1000 hours), a peeling strength between prepreg and core of greater than or equal to 3.0 lb/in and a difference rate of dielectric constant of less than or equal to 5%.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should be also appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising 50 parts by weight of a vinyl-containing polyphenylene ether resin, 1 part by weight to 30 parts by weight of a styrene-butadiene-styrene block copolymer and 0.5 part by weight to 30 parts by weight of a zinc molybdate-covered silica, wherein the zinc molybdate-covered silica has a mass ratio of zinc molybdate to silica of between 1:9 and 2:8.

2. The resin composition of claim 1, wherein the vinyl-containing polyphenylene ether resin comprises a vinylbenzyl-containing biphenyl polyphenylene ether resin, a methacrylate-containing polyphenylene ether resin or a combination thereof.

3. The resin composition of claim 1, wherein the zinc molybdate-covered silica has a particle size distribution D50 of between 2 μm and 4 μm.

4. The resin composition of claim 1, further comprising a bifunctional aliphatic long-chain acrylate.

5. The resin composition of claim 1, further comprising triallyl isocyanurate, triallyl cyanurate, maleimide resin, polyolefin different from the styrene-butadiene-styrene block copolymer, small molecule vinyl compound, epoxy resin, cyanate ester resin, phenolic resin, styrene maleic anhydride, polyester resin, amine curing agent, polyamide resin, polyimide resin or a combination thereof.

6. The resin composition of claim 1, further comprising inorganic filler, flame retardant, curing accelerator, polymerization inhibitor, solvent, silane coupling agent, coloring agent, toughening agent or a combination thereof.

7. An article made from the resin composition of claim 1, comprising a prepreg, a resin film, a laminate or a printed circuit board.

8. The article of claim 7, having a gel time stability calculated according to a gel time as measured by reference to IPC-TM-650 2.3.18 of less than or equal to 32 seconds.

9. The article of claim 7, having a copper foil peeling strength as measured by reference to IPC-TM-650 2.4.8 of greater than or equal to 3.5 lb/in.

10. The article of claim 7, having a difference rate of dissipation factor calculated according to a dissipation factor as measured by reference to JIS C2565 at 10 GHz of less than or equal to 40%.

11. The article of claim 7, which passes a conductive anodic filament test as conducted by reference to IPC-TM-650 2.6.25 at 1000V voltage for 250 hours.

12. The article of claim 7, which passes a conductive anodic filament test as conducted by reference to IPC-TM-650 2.6.25 at 100V voltage for 1000 hours.

* * * * *